No. 764,147. PATENTED JULY 5, 1904.
E. P. NOORD.
CHURN.
APPLICATION FILED OCT. 31, 1903.
NO MODEL.
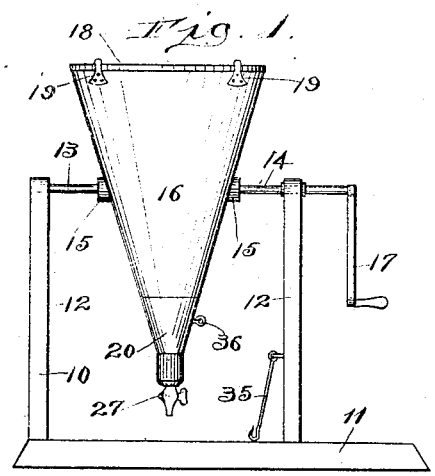
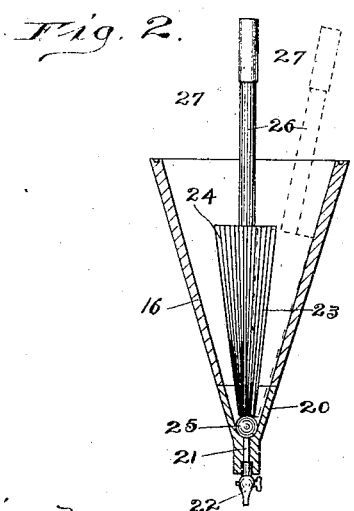
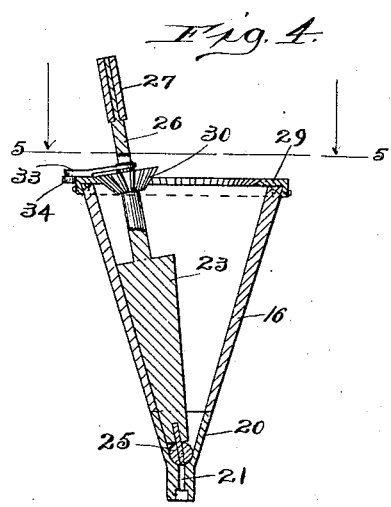
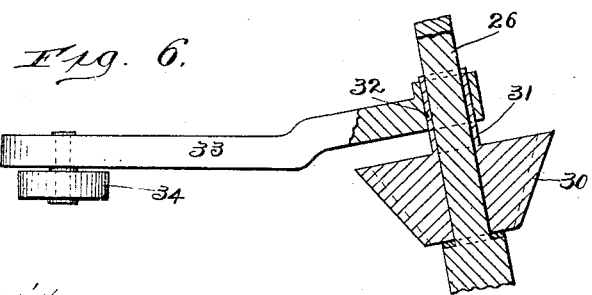
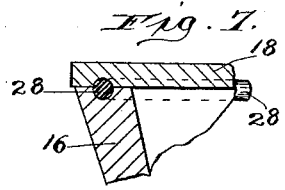
Witnesses:
Chas. E. Gorton
A. Gustafson
Inventor:
Erik P. Noord.
By Chas. A. Tillman
Atty.

No. 764,147.

Patented July 5, 1904.

UNITED STATES PATENT OFFICE.

ERIK P. NOORD, OF CHICAGO, ILLINOIS.

CHURN.

SPECIFICATION forming part of Letters Patent No. 764,147, dated July 5, 1904.

Application filed October 31, 1903. Serial No. 179,330. (No model.)

*To all whom it may concern:*

Be it known that I, ERIK P. NOORD, a subject of the King of Sweden and Norway, residing at Chicago, in the county of Cook and State of Illinois, have invented certain new and useful Improvements in Churns, of which the following is a specification.

This invention relates to improvements in churns; and it consists in certain peculiarities of the construction, novel arrangement, and operation of the various parts thereof, as will be hereinafter more fully set forth and specifically claimed.

The principal object of the invention is to provide a churn which shall be simple and inexpensive in construction, strong, durable, and effective in operation, and so made that the butter may be readily collected or gathered and the milk or whey expressed and withdrawn therefrom while in the churning vessel.

In order to enable others skilled in the art to which my invention pertains to make and use the same, I will now proceed to describe it, referring to the accompanying drawings, in which—

Figure 1 is a view in side elevation of a churn embodying my invention, showing it mounted upon a frame ready for use. Fig. 2 is a central vertical sectional view of the vessel, showing it removed from the frame and illustrating the dasher or collector therein. Fig. 3 is a top plan view of the dasher or collector. Fig. 4 is a central sectional view of the churn and the collector therein, showing modified forms thereof. Fig. 5 is a plan view of the same. Fig. 6 is an enlarged view, partly in elevation and partly in section, of a portion of the collector and a part of the gear therefor; and Fig. 7 is a sectional view of the upper portion of the vessel, showing the cover thereon.

Like numerals of reference refer to corresponding parts throughout the different views of the drawings.

The reference-numeral 10 represents the main or supporting frame, which may be of any suitable construction, but in the present instance is shown as comprising a base 11 and two uprights 12, mounted thereon. Horizon-
tally journaled on the upper portion of the uprights 12 are shafts 13 and 14, the inner ends of which are fitted into suitable keepers 15 on the outer surface of the vessel 16, which is conical in shape and may be made of any suitable size and material. The outer end of the shaft 14 is provided with a crank-handle 17, used for rotating the vessel 16, which has its large end closed by means of a cover 18, which may be secured thereon by means of fasteners 19 of any suitable construction. The lower portion 20 of the vessel 16 is preferably formed of hard wood and has a discharge-opening 21, in which is fitted a faucet 22 to open and close it, so as to permit the milk or whey to pass therethrough.

Located in the vessel 16 is a collector or dasher which consists of a tapered or conical-shaped body 23, which is provided with longitudinal corrugations 24, extending from one end thereof to the other. Rotatably secured on the lower portion of the body 23 of the collector or dasher is a ball 25, which fits snugly within the lower portion of the cavity of the vessel, as is clearly shown in Figs. 2 and 4 of the drawings, and will prevent the escape of milk therefrom. Extending from the upper portion of the body 23 of the collector is a stem 26, which has rotatably secured on its upper end a handle 27 to be used in operating the dasher or collector. The edge of the enlarged end of the vessel is provided with a packing-ring 28, which when the cover 18 is secured on the vessel will be interposed therebetween, so as to prevent leakage.

In Figs. 4 and 5 of the drawings I have shown a modification in the construction of the churn, which consists in securing on the enlarged end of the vessel an internal gear 29, the teeth of which are slightly beveled to correspond with those on the beveled gear 30, which is rigidly mounted on the stem 26 of the collector. The upper portion of the gear 30 is provided with a hollow projection 31, which extends upwardly through an opening 32 in the inner portion of a plate 33, which is substantially triangular in shape and has horizontally journaled in each of its corners a friction-roller 34 to impinge with the outer surface of the vessel, so as to hold the gear 30 in continuous engagement with the internal gear.

From the foregoing and by reference to the drawings it will be seen and clearly understood that by placing a quantity of milk in the vessel 16 and securing the cover 18 in place on its enlarged end, so as to prevent leakage, it may be rotated, so that the milk will be thrown from one end thereof to the other, in which operation it will be greatly agitated, and as it falls into the tapered portion of the vessel it will be subjected to pressure, thus quickly producing butter. After the butter has been produced the vessel may be firmly secured in an upright position on the supporting-frame by means of brace-rods 35, which are secured at one of their ends to the uprights of the frame and may be hooked into eyelets or other suitable fastenings 36 on the lower portion of the vessel. When thus secured, the cover 18 may be removed and the collector inserted therein, so that the ball 25 will fit in the contracted portion of the cavity of the vessel, when the body portion 23 of the collector may be rotated against the walls of the vessel, thus collecting or gathering the butter as it floats in the milk. When the butter has thus been gathered, the faucet 22 may be opened, so as to allow the milk or fluid to be discharged, after which the butter may be salted and removed to another vessel.

In the modified construction shown in Figs. 4 and 5 of the drawings the same operation is performed; but I employ the gear above described, so that the dasher or collector may be held against the wall of the vessel and its rotation be positive.

Having thus fully described my invention, what I claim as new, and desire to secure by Letters Patent, is—

1. The combination with a conical-shaped vessel, of a collector located therein and comprising a tapered corrugated body provided on its upper portion with a stem and a ball rotatably secured to the lower portion of the body, substantially as described.

2. The combination with a conical-shaped vessel, of a collector located therein and comprising a tapered corrugated body having on its upper portion a stem provided with a handle rotatably secured thereto, and a ball rotatably secured on its lower end, substantially as described.

3. The combination with a conical-shaped vessel, of an internal gear secured on its enlarged end, a collector located in the vessel and comprising a tapered corrugated body having on its upper portion a stem and on its lower portion a rotatable ball, a gear mounted on the stem to mesh with the internal gear, substantially as described.

4. The combination with a conical-shaped vessel, of an internal gear secured on its enlarged end, a collector located in the vessel and comprising a tapered corrugated body having on its upper portion a stem and on its lower portion a rotatable ball, a gear mounted on the stem to mesh with the internal gear and having a hollow upwardly-extending projection, a plate provided at its inner portion with an opening to receive said projection, and friction-rollers journaled on the outer portion of said plate to contact with the outer surface of the vessel, substantially as described.

5. A butter-collector comprising a tapered corrugated body provided on its upper portion with a stem, a handle rotatably mounted on said stem, and a ball rotatably secured to the lower portion of the body, substantially as described.

ERIK P. NOORD.

Witnesses:
 CHAS. C. TILLMAN,
 A. GUSTAFSON.